US009094812B2

(12) United States Patent  (10) Patent No.: US 9,094,812 B2
Marsico  (45) Date of Patent: Jul. 28, 2015

(54) METHODS, SYSTEMS, AND COMPUTER READABLE MEDIA FOR PROVIDING INTERACTIVE USER CONTROLLED POLICY

(75) Inventor: Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 968 days.

(21) Appl. No.: 13/251,796

(22) Filed: Oct. 3, 2011

(65) Prior Publication Data
US 2012/0108343 A1    May 3, 2012

Related U.S. Application Data

(60) Provisional application No. 61/409,390, filed on Nov. 2, 2010.

(51) Int. Cl.
G06F 15/173 (2006.01)
H04W 8/20 (2009.01)
(52) U.S. Cl.
CPC ........................................ H04W 8/20 (2013.01)
(58) Field of Classification Search
None
See application file for complete search history.

(56) References Cited

U.S. PATENT DOCUMENTS

2010/0150003 A1* 6/2010 Andreasen et al. ........... 370/252
2011/0208853 A1* 8/2011 Castro-Castro et al. ...... 709/223
2011/0270722 A1* 11/2011 Cai et al. ......................... 705/34

OTHER PUBLICATIONS

"3rd Generation Partnership Project; Technical Specification Group Core Network and Terminals; Policy and Charging Control over Gx reference point (Release 9)," 3GPP TS 29.212 V9.2.0 (Mar. 2010).

* cited by examiner

Primary Examiner — Chi H Pham
Assistant Examiner — Fahmida Chowdhury
(74) Attorney, Agent, or Firm — Jenkins, Wilson, Taylor & Hunt, P.A.

(57) ABSTRACT

Methods, systems, and computer readable media for providing interactive user controlled policy are disclosed herein. One method includes, at a policy enhancement server (PES), receiving, from an application service provider, an indication that a user is eligible for enhanced network policy in response to the user accessing an application service provided by an application service provider. In response to receiving the indication, at least one attribute of a network policy associated with the user is enhanced.

25 Claims, 7 Drawing Sheets

METHODS, SYSTEMS, AND COMPUTER READABLE MEDIA FOR PROVIDING INTERACTIVE USER CONTROLLED POLICY

PRIORITY CLAIM

This application claims the benefit of U.S. Provisional Patent Application Ser. No. 61/409,390 filed Nov. 2, 2010; the disclosure of which is incorporated herein by reference in its entirety.

TECHNICAL FIELD

The subject matter described herein relates to policy control in a communications network. More specifically, the subject matter relates to methods, systems, and computer readable media for providing interactive user controlled policy.

BACKGROUND

A policy and charging rules function (PCRF), or policy engine, at its most basic level, is a server that deploys a set of operator-created business rules in a communications network. These rules can be used to define how broadband network resources should be allocated to subscribers and applications and under what conditions. The PCRF is a policy decision point that may be centrally located in the network and communicates with access edge devices (e.g., policy enforcement points), applications, and operational support systems/business support systems (OSS/BSS) platforms to manage subscriber and network information according to the established rules. Policy rules encompass the business and technological rules that govern which network services a subscriber can access, at what bandwidth level, when, and for how long. Generally speaking, the PCRF queries, coordinates, and adjusts all of the network resources needed to provide the required services to individual, authorized subscribers. As such, the PCRF operates solely in the control plane and does not operate in the data plane. More specifically, the PCRF identifies appropriate policy rules by querying a subscription profile repository (SPR) and enforces them by sending them to, for example, a policy charging enforcement function (PCEF).

Currently, users of network services cannot control the policy rules that are applied to their communications. Instead, these rules may be determined by the network operator based on factors such as the time of day and the location of the user (e.g., home or visited network). Additionally, many application service providers, such as those providing online interactive video games, may rely on high quality network access to provide a high quality application experience. This may be especially true for some subscribers more than other subscribers, such as users who may log many hours per week with an online application service as compared with users who may log fewer hours with those same services. It may be desirable to allow network operators to partner with application service providers in order to allow users to control the policy rules to be applied to their network communications.

Accordingly, in light of these difficulties, a need exists for improved methods, systems, and computer readable media for providing interactive user controlled policy.

SUMMARY

Methods, systems, and computer readable media for providing providing interactive user controlled policy are disclosed herein. One method includes, at a policy enhancement server (PES), receiving, from an application service provider, an indication that a user is eligible for enhanced network policy in response to the user accessing an application service provided by an application service provider. In response to receiving the indication, at least one attribute of a network policy associated with the user is enhanced.

A system for providing interactive user controlled policy is also disclosed. The system, such as a policy enhancement server, includes receiving, at a communications module and from an application service provider, an indication that a user is eligible for enhanced network policy in response to the user accessing an application service provided by an application service provider. A policy enhancement module enhances at least one attribute of a network policy associated with the user in response to receiving the indication.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

Figure 1:
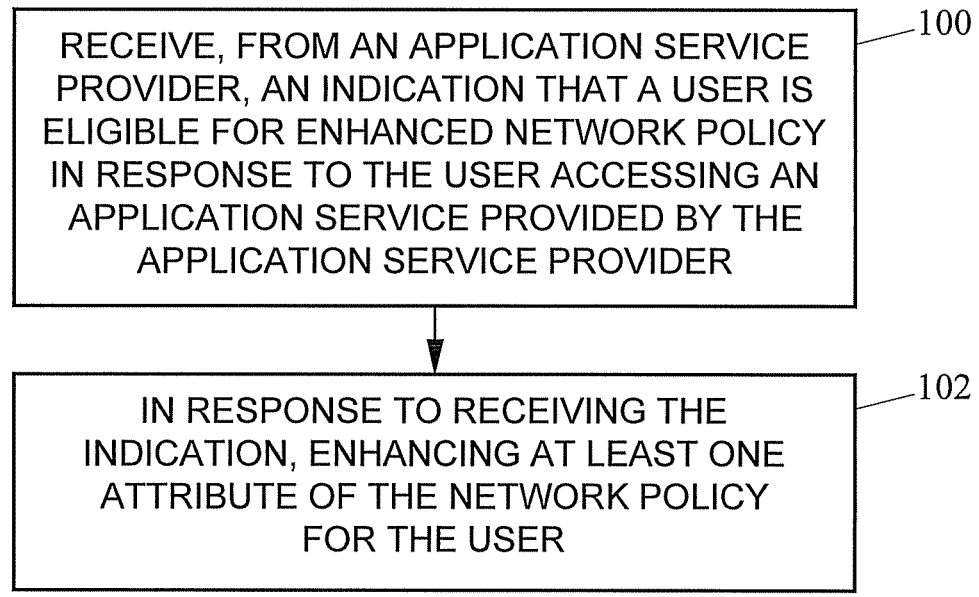
FIG. 1 is a flow chart illustrating exemplary steps for providing interactive user controlled policy according to an embodiment of the subject matter described herein.

The subject matter disclosed herein includes systems and methods for providing interactive user controlled policy. The method includes receiving, at a policy enhancement server, an indication that a user is eligible for enhanced network policy.

In response to receiving the indication, at least one attribute of a network policy associated with the user is enhanced. The PES may be adapted to communicate with a network server associated with the application service provider to obtain "award level" or "policy enhancement" instructions for a user/subscriber. In one embodiment, the policy enhancement server may notify the users of the enhanced policy attribute using one of a short message service (SMS) message, a multimedia message service (MMS) message, an instant message (IM) message, an email message, an extensible markup language (XML) message, a simple object access protocol, Diameter protocol message, session initiation protocol (SIP) message. The policy enhancement server may also generate accounting and billing information associated with the policy enhancement.

The subject matter described herein is not limited to interactions with on-line game service providers. The described systems and methods can be applied to other services and applications that are available to communication network subscribers.

For example, according to one aspect, systems and methods are disclosed for enabling a network operator to enter into partnering agreements with application service providers, such as providers of online/interactive game services, so as to allow game service providers to offer users (individually or groups) access to a network operator's network using a temporarily or permanently enhanced level of network policy. For example, a game service provider could offer a user the chance to receive enhanced (e.g., "platinum") network policy attributes (e.g., guaranteed download bitrate, maximum download bitrate, permitted service flow, permitted QoS class, permitted access point name (APN), permitted destination IP address/port, download quota, etc.) from an associated network service provider (e.g., LTE network service provider). For example, a user may be a subscriber of Verizon Wireless, with a "Silver" subscription plan that provides for wireless broadband service with a guaranteed download bitrate of 500 Kb/s. In one use case, the user may log fifty hours of game playing time in one month via the game service provider. As a result, the game service provider notifies a PES in the Verizon Wireless network that the user is now eligible to have the user's policy/service subscription level temporarily or permanently boosted to "Platinum" (e.g., a guaranteed download bitrate of 1 Mb/s). It should be noted that, in this example, the 1 Mb/s guaranteed download bitrate may be allocated by the PCRF/RACS amongst any number of service flows associated with the user (including service flows that are not associated with the game service provider). In another example, a user that reaches an "award" level with the game service provider may be granted temporary or permanent access to a service, such as an audio or video streaming service or IP TV streaming service. In this case, the game service provider may signal the Verizon Wireless PES with information that indicates that the user is eligible to have their policy/service subscription level temporarily or permanently boosted in a manner that grants the user access to an APN associated with the audio or video streaming service. The PES may in turn notify a PCRF/RACS of the subscription policy enhancement, and the PCRF/RACS may signal a PCEF via the Gx interface with an updated PCC rule that permits access to the audio or video streaming service APN.

In another embodiment, a game service user may reach an award level established by the game service provider and a server associated with the game service may be configured, in response, to communicate with a policy enhancement server. The game service server may communicate information identifying the user (or users) that are eligible for broadband subscription policy enhancement, as well as information that specifies the enhancement level or policy attributes to be enhanced. The policy enhancement server is adapted to communicate with a PCRF/RACS (e.g., via Sp/Diameter/other interface) and convey the policy enhancement information. The PCRF/RACS may then signal the PCEF(s) serving the user(s) and install the appropriate PCC rule(s) to effect the awarded policy enhancement.

Advantages of the subject matter described herein may include allowing network operators to partner with application service providers in order to allow users to control the policy rules to be applied to their network communications.

FIG. 1 is a flow chart illustrating exemplary steps for providing interactive user controlled policy according to an embodiment of the subject matter described herein. Referring to FIG. 1, in step 100, an indication of an application service provider user is received, from an application service provider, indicating that a user is eligible for enhanced network policy in response to the user accessing an application service provided by the application service provider. As used herein, network policy enhancement may include one or more PCC rules, quality of service attribute values or other network policy attributes. For simplicity of discussion, the term "network policy" or "policy" will be used throughout for referring to any attribute, parameter or set thereof for altering a metric associated with a communications session in a communications network. For example, the application service may include an online game or a streaming audio or video service.

In addition to receiving a single indication for a single user, in one embodiment, multiple indications corresponding to two or more users that are eligible for enhanced network policy may be received by a policy enhancement server from one or more application service providers. In another embodiment, the indication may include a group indication corresponding to a group of users that indicates that the group of users is eligible for enhanced network policy.

In step 102, in response to receiving the indication, at least one attribute of the network policy associated with the user is enhanced. In one embodiment, enhancing the at least one attribute of the network policy may include increasing one of a guaranteed download bitrate, a maximum download bitrate, a permitted service flow, a permitted quality of service (QoS) class, a permitted access point name (APN), a permitted destination IP address, a permitted destination port number, and a download quota. Enhancing the one or more attributes of the network policy may include temporarily enhancing a network policy of the user for one of: sessions associated with the application service provider, sessions not associated with the application service provider, or for all sessions regardless of whether the sessions are associated with the application service provider. In order to enhance the network policy applied to a user, the indication of enhanced network policy may be sent to at least one of a policy and charging rules function (PCRF) and/or a resource and admission control sub-system (RACS), and one or more PCC rules may be installed at a policy charging enforcement function (PCEF). The indication of enhanced network policy may be sent using a Diameter interface (e.g., Sp interface), or other suitable network interface without departing from the scope of the subject matter described herein. Accounting and billing records associated with a communications session provided during the enhanced network policy period may also be generated.

Figure 2:
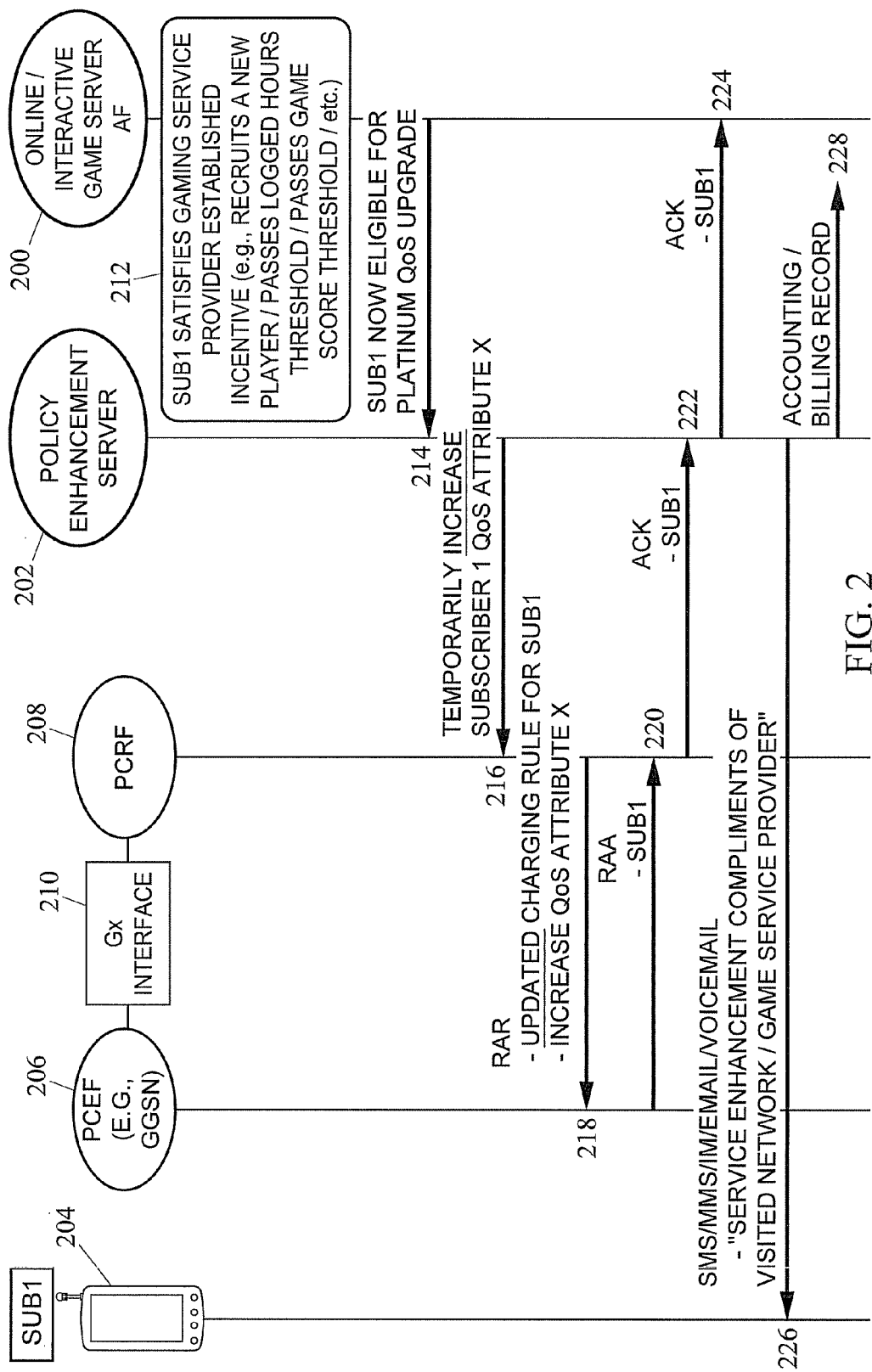
FIG. 2 is a network diagram illustrating an exemplary messaging scenario for providing interactive user controlled policy according to an embodiment of the subject matter described herein.

FIG. 2 is a network diagram illustrating an exemplary messaging scenario for providing an individual network policy enhancement according to an embodiment of the subject matter described herein. Referring to FIG. 2, server/ application function (AF) 200 may be associated with a game service provider and may be configured to signal policy enhancement server (PES) 202 that user 204 (who is also a subscriber of the communications network that owns/controls/administers the PCEF+PCRF+PES) is eligible for a policy enhancement. In response, PES 202 may signal PCRF 208 that policy enhancement should be enacted for the user. In one embodiment, PES 202 may include specific enhanced policy attribute value(s) to PCRF 208. In another embodiment, PES 202 may signal PCRF 208 with a previously agreed upon policy code or indicator that is used by PCRF 208 to determine the enhanced policy attribute value(s). PES 202 may also communicate information to PCRF 208 that specifies the duration of the policy enhancement. For example, PES 202 may indicate that enhanced QoS should be provided for 1 hour. Next, PCRF 208 may generate a new policy rule (e.g., PCC rule) for the user that includes the enhanced policy attribute(s) and PCRF 208 may communicate the new PCC rule to PCEF 206 via Gx interface 210 for installation and enforcement.

Thus, in the exemplary scenario shown in FIG. 2, an individual user may receive a network policy enhancement. In step 212, a first subscriber (Sub1) may satisfy a gaming service provider established incentive such as recruiting a new user, passing a number of hours logged threshold, or passing a game score threshold. In step 214, the service provider may determine that the user is eligible for enhanced network policy, such as a platinum QoS upgrade, and application service provider server 200 may signal PES 202 to request network policy enhancement for user 204. PES 202 may then send message 216 to PCRF 208 indicating a temporary increase in QoS attribute X for Sub1. PCRF 208 may then generate appropriate PCC rules and install them on PCEF 206. For example, PCRF 208 may send RAR message 218 that includes updated charging rules for Sub1 indicating an increase in QoS attribute X to PCEF 206. In response, PCEF 206 may return RAA message 220 to PCRF 208 for Sub1. In response, PCEF 206 may return RAA message 220 to PCRF 208 for Sub1. In step 222, PCRF 208 may send an acknowledgement message for Sub1 to PES 202 and in step 224 PES 202 may send an acknowledgement message for Sub1 to service provider server 200. A communications session may be established with Sub1 204 (with enhanced QoS attribute X). In step 226, a message notifying the user of the network policy enhancement associated with the communications session may be sent to Sub1 204. For example, the notification may be sent using an SMS, MMS, IM, email, voicemail, or similar message including text such as "Service enhancement compliments of [the visited network or game service provider]". In step 424, accounting and/or billing record(s) may be generated by PES 202 and transmitted to appropriate server(s).

In another embodiment (not shown), PES 202 may signal PCRF 208 at the initiation and termination of the policy enhancement period. In this case PES 202 initially provides instructions to the PCRF (as described above) at the start of the enhanced policy period. PES 202 may then monitor the duration of the policy enhancement and, at the expiration time, signal PCRF 208 again with instructions to return to pre-enhancement policy levels.

In one embodiment, PES 202 may generate an accounting/billing record associated with the policy enhancement. The accounting/billing record may include information that identifies: affected users/subscriber identifier(s) (e.g., subscriber IMSI, subscriber username, subscriber MSISDN, subscriber public identity, subscriber URI, etc.), enhanced policy attribute(s), enhanced policy attribute value(s), duration of policy enhancement, application service provider/partner (e.g., game service provider), serving PCRF identifier, serving PCEF identifier, or a requesting application service provider server identifier (e.g., hostname, IP address/port, etc.).

Figure 3:
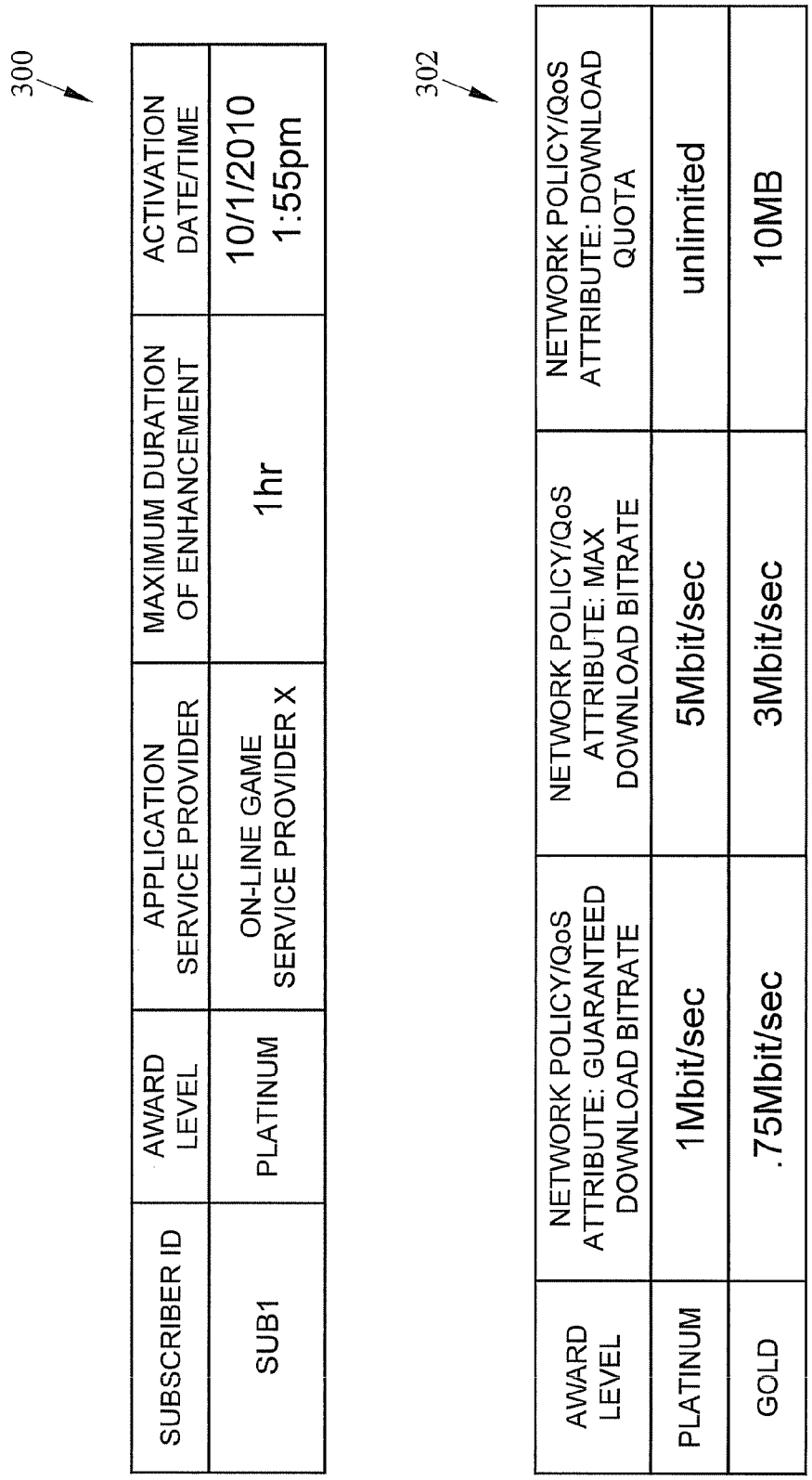
FIG. 3 is a set of tables illustrating exemplary information that may be maintained by a policy enhancement server for providing interactive user controlled policy according to an embodiment of the subject matter described herein.

FIG. 3 is a set of tables illustrating exemplary information that may be maintained by a policy enhancement server for providing user receptivity driven policy in a communications network according to an embodiment of the subject matter described herein. Referring to FIG. 3, the information maintained by PES 202 may include network policy information, quality of service definitions, rules, and use log data. For example, table 300 may include a subscriber identifier associated with an award level, an application service provider, a maximum duration of network enhancement, and an activation date/time. In the example shown in table 300, Sub1 may be associated with a platinum award level for online game service provider X. On Oct. 1, 2010 at 1:55 pm, Sub1 was provided with enhanced network service for one hour. Table 302 may include information indicating details of the network enhancement provided. Table 302 may include one or more award levels and one or more associated network policies. For example, a first network policy may include a guaranteed download bit rate, a second network policy may include a maximum download bitrate, and a third network policy may include a download quota. As shown in table 302, the platinum award level may be associated with a higher level of network policy enhancement than the gold level because the platinum level is associated with a 1 Mbit/sec guaranteed download bitrate, a 5 Mbit/sec maximum download bitrate, and an unlimited download quota while the gold level is associated with a 0.75 Mbit/sec guaranteed download bitrate, a 3 Mbit/sec maximum download bitrate, and a 10 MB download quota. It is appreciated that additional information not shown in FIG. 3 may also be maintained by PES 202 without departing from the scope of the subject matter described herein.

Figure 4A:
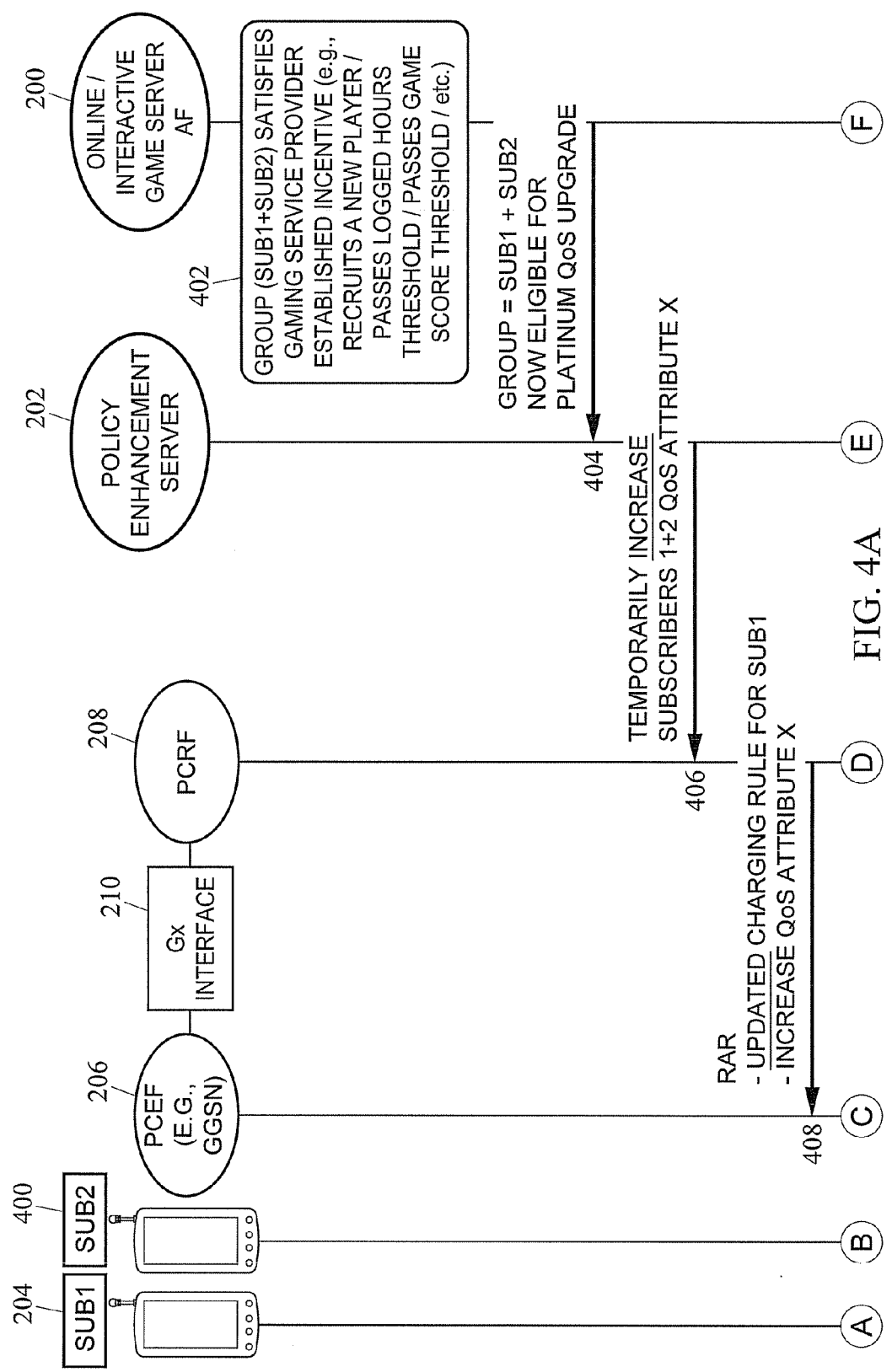
FIGS. 4A and 4B are a network diagram illustrating an exemplary messaging scenario for providing interactive user controlled policy according to an embodiment of the subject matter described herein.
Figure 4B:
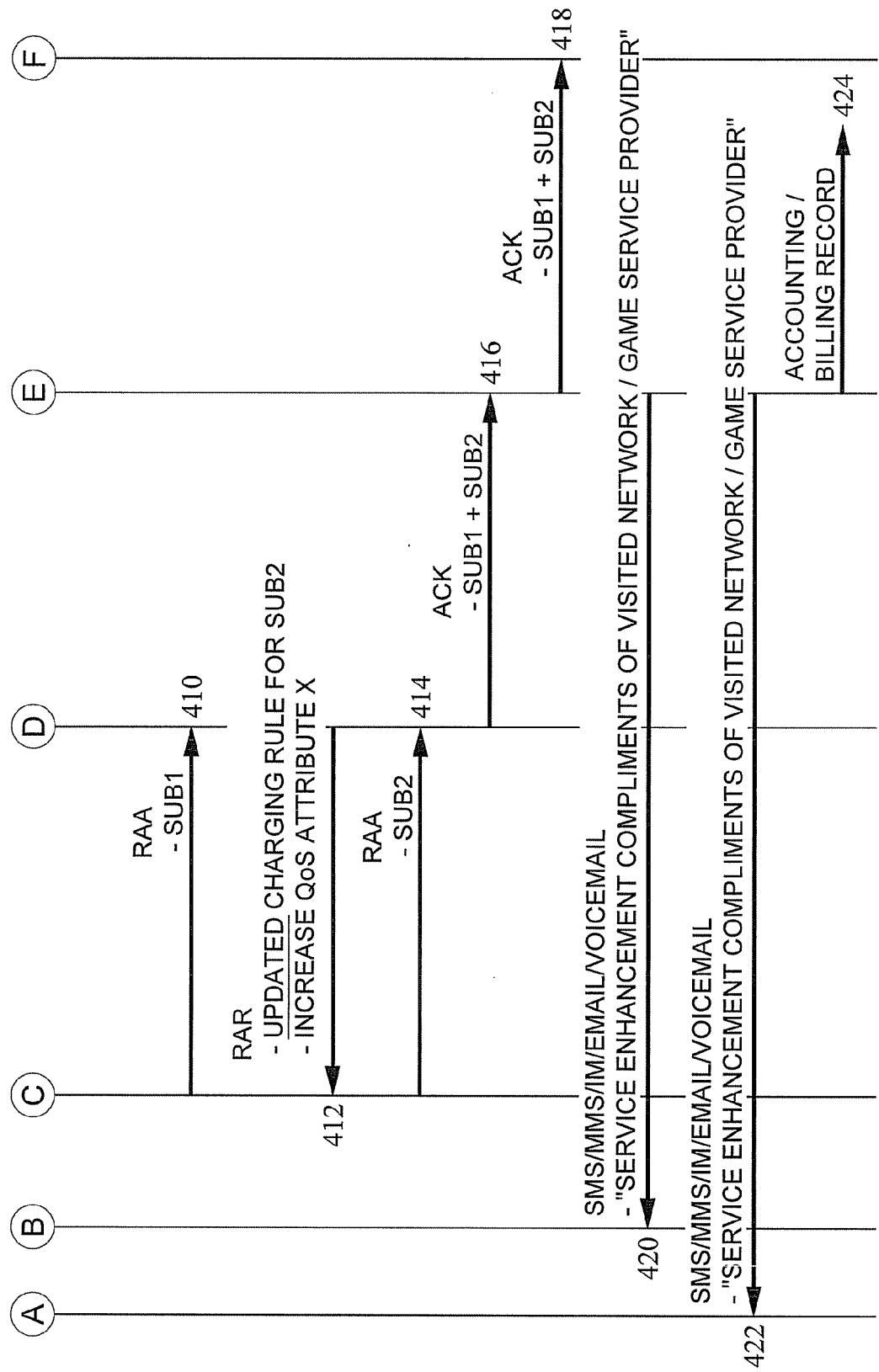

FIGS. 4A and 4B are a network diagram illustrating an exemplary messaging scenario for providing interactive user controlled policy according to an embodiment of the subject matter described herein. In FIG. 4, a server associated with a game service provider is configured to signal PES 202 that a group of users (who are also a subscriber of the communications network that owns/controls/administers the PCEF+PCRF+PES) are eligible for a policy enhancement. In response, PES 202 may signal PCRF 208 that policy enhancement should be enacted for the user. In one scenario, PES 202 may include specific enhanced policy attribute value(s) in a message sent to PCRF 208. In another scenario, PES 202 may signal PCRF 208 with a previously agreed upon policy code or indicator that is used by PCRF 208 to determine the enhanced policy attribute value(s). PES 202 may also communicate information to PCRF 208 that specifies the duration of the policy enhancement. PCRF 208 generates a new policy rule (e.g., PCC rule) for the user that includes the enhanced policy attribute(s). PCRF 208 communicates the new PCC rule to PCEF 206 via Gx interface 210.

In the scenario shown in FIG. 4, a group including multiple users may receive a collective policy enhancement. For example, one group may consist of both a first subscriber (i.e., Sub1) 204 and a second subscriber (i.e., Sub2) 400. In step 402, the group may satisfy a gaming service provider established incentive such as recruiting a new user, passing a number of hours logged threshold, or passing a game score threshold. In step 404, the service provider may determine that the group is eligible for enhanced network policy, such as a platinum QoS upgrade, and application service provider server 200 may signal PES 202 to request network policy enhancement for user 204. PES 202 may then send message 406 to PCRF 208 indicating a temporary increase in QoS attribute X for Sub1 and Sub2. PCRF 208 may then generate appropriate PCC rules and install them on PCEF 206. For example, PCRF 208 may send RAR message 408 that includes updated charging rules for Sub1 indicating an increase in QoS attribute X to PCEF 206. In response, PCEF 206 may return RAA message 410 to PCRF 208 for Sub1. PCRF 208 may then repeat this process for Sub2 by sending RAR message 412 that includes updated charging rules for Sub2 indicating an increase in QoS attribute X to PCEF 206. In response, PCEF 206 may return RAA message 414 to PCRF 208 for Sub2. In step 416, PCRF 208 may send an acknowledgement message for Sub1+Sub2 to PES 202 and in step 418 PES 202 may send an acknowledgement message for Sub1+Sub2 to service provider server 200. In steps 420 and 422, a message notifying the user of the temporary network policy enhancement associated with the communications session may be sent to Sub1 204 and Sub2 400. In step 424, accounting and/or billing record(s) may be generated by PES 202 and transmitted to appropriate server(s).

Figure 5:
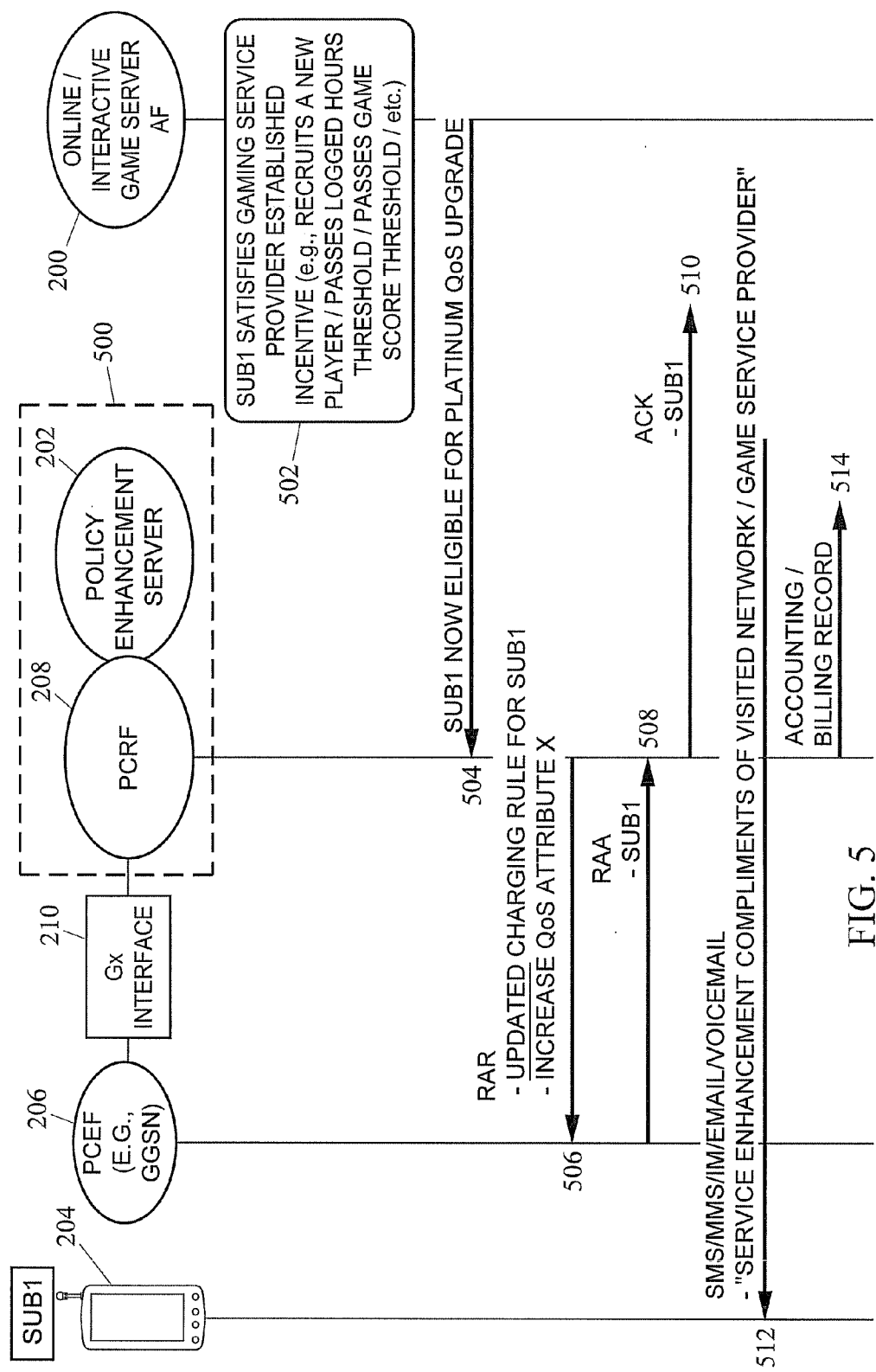
FIG. 5 is a network diagram illustrating an exemplary messaging scenario for providing interactive user controlled policy according to an embodiment of the subject matter described herein.

FIG. 5 is an exemplary embodiment where the PES is co-located or integrated with the PCRF. Referring to FIG. 5, in step 502, Sub1 may satisfy a gaming service provider established incentive such as recruiting a new user, passing a number of hours logged threshold, or passing a game score threshold. In step 504, application service provider server 200 signals integrated PES-PCRF node 500 to request network policy enhancement for user 204. Integrated PES-PCRF node 500 may then formulate appropriate PCC rules (as described above) and install them on PCEF 206. For example, integrated PES-PCRF node 500 may send RAR message 506 that includes updated charging rules for Sub1 indicating an increase in QoS attribute X to PCEF 206. In response, PCEF 206 may return RAA message 508 to integrated PES-PCRF node 500 for Sub1. In step 510, integrated PES-PCRF node 500 may send an acknowledgement message (corresponding to message 504) to application service provider server 200. In step 512, a communications session is performed with Sub1 204. For example, the communications session may include an SMS, MMS, IM, email, voicemail, or similar message. Optionally, the message may include a message notifying the user of the temporary network policy enhancement associated with the communications session. In step 514, accounting and/or billing record(s) may be generated by integrated PES-PCRF node 500 and transmitted to appropriate server(s).

Figure 6:
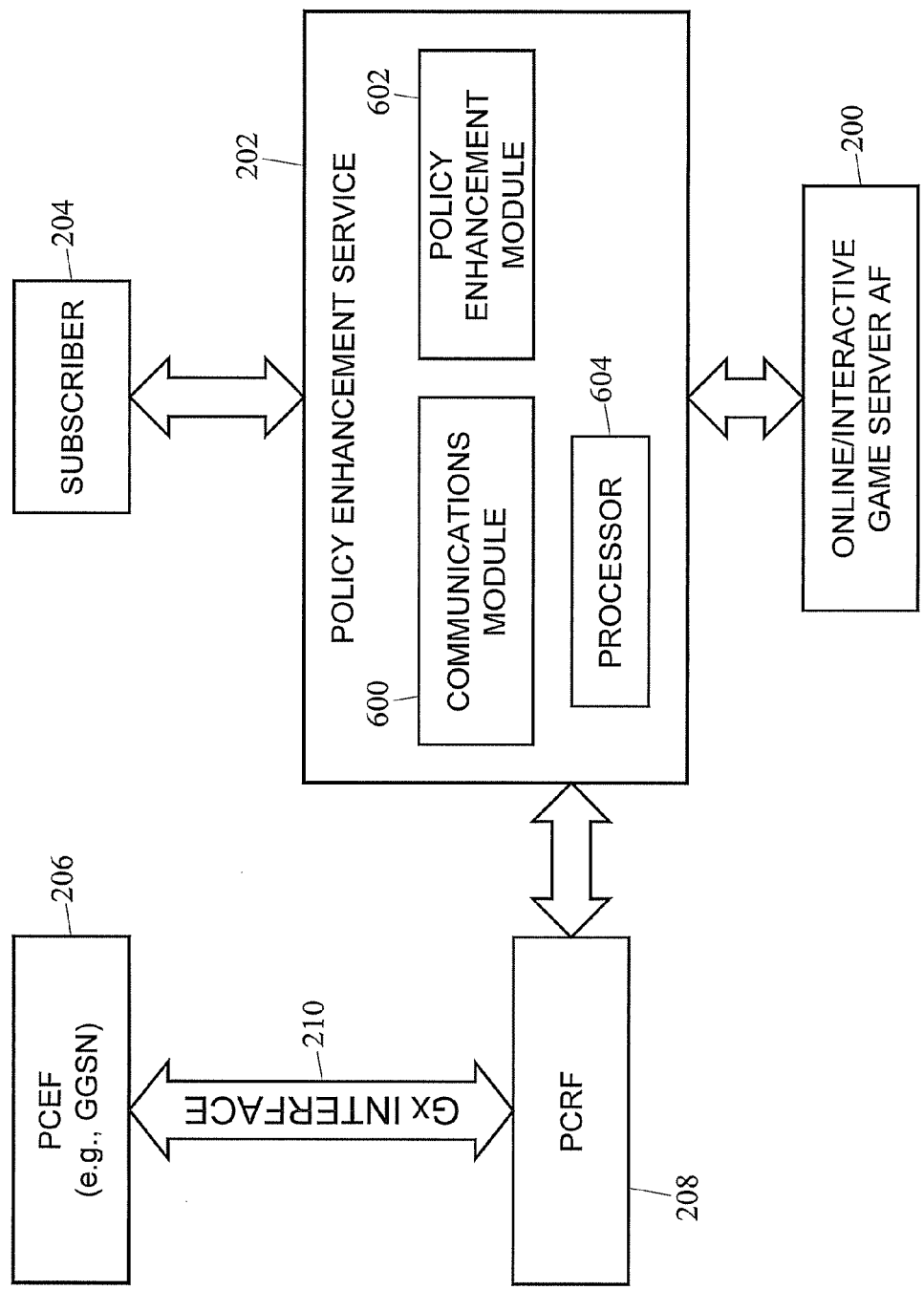
FIG. 6 is a block diagram illustrating an exemplary system for providing interactive user controlled policy according to an embodiment of the subject matter described herein.

FIG. 6 is a block diagram illustrating an exemplary system for providing interactive user controlled policy according to an embodiment of the subject matter described herein. Referring to FIG. 6, policy enhancement server 202 may include a variety of specific hardware components providing interactive user controlled policy including communications module 600, policy enhancement module 602, and processor 604. Modules 600 and 602 may include software instructions that when executed by processor 604 perform steps. Communications module 600 may be configured to receive, from an application service provider, an indication of an application service provider user requesting enhancement of network policy for the user. For example, PES 202 may receive a message indicating that one or more users have satisfied a gaming service provider established incentive from game server 200. Policy enhancement module 602 may be configured to enhance one or more attributes of the network policy associated with the user in response to communications module 600 receiving the indication. A notification of the enhancement of the network policy may be provided to the user in, for example, an SMS message or an email.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing interactive user controlled policy, the method comprising:
   at a policy enhancement server (PES):
      receiving, from an application service provider, an indication that a user is eligible for enhanced network policy in response to the user accessing an application service provided by the application service provider; and
      in response to receiving the indication, enhancing at least one attribute of a network policy associated with the user;
      wherein enhancing the at least one attribute of the network policy includes establishing one or more network policy performance tiers associated with different network policies and providing the application service to the user using one or more performance attributes associated with one of the network policy performance tiers.

2. The method of claim 1 wherein receiving the indication includes receiving two or more indications that two or more users are eligible for enhanced network policy.

3. A method for providing interactive user controlled policy, the method comprising:
   at a policy enhancement server (PES):
      receiving, from an application service provider, an indication that a user is eligible for enhanced network policy in response to the user accessing an application service provided by the application service provider; and
      in response to receiving the indication, enhancing at least one attribute of a network policy associated with the user;
      wherein receiving the indication includes receiving a group indication for a group of users that indicates that the group of users are eligible for enhanced network policy, wherein the group indication includes two or more subscriber identifiers for identifying two or more users.

4. The method of claim 1 wherein enhancing the at least one attribute of the network policy includes increasing one of a guaranteed download bitrate, a maximum download bitrate, a permitted service flow, a permitted quality of service (QoS) class, a permitted access point name (APN), a permitted destination IP address, a permitted destination port number, and a download quota.

5. The method of claim 1 wherein enhancing the at least one attribute of the network policy includes sending the indication of enhanced network policy to at least one of a policy and charging rules function (PCRF) and a resource and admission control sub-system (RACS).

6. The method of claim 5 wherein the indication of enhanced network policy is sent using a Diameter interface.

7. The method of claim 1 wherein enhancing the at least one attribute of the network policy includes installing one or more PCC rules at a policy and charging enforcement function (PCEF).

8. The method of claim 1 wherein enhancing the at least one attribute of the network policy includes enhancing a network policy of the user for one of:

only sessions associated with the application service provider, only for sessions not associated with the application service provider, and for all sessions regardless of whether the sessions are associated with the application service provider.

9. The method of claim 1 comprising generating accounting and billing records associated with a communications session provided while the at least one attribute of the network policy is enhanced.

10. The method of claim 1 wherein the application service comprises an online game.

11. The method of claim 1 wherein the application service comprises a streaming audio or video service.

12. A system for providing providing interactive user controlled policy, the system comprising:
  a communications module for receiving, from an application service provider, an indication that a user is eligible for enhanced network policy in response to the user accessing an application service provided by the application service provider; and
  a policy enhancement module for enhancing at least one attribute of a network policy associated with the user in response to receiving the indication;
  wherein the policy enhancement module is configured to establish one or more network policy performance tiers associated with different network policies and providing the application service to the user using one or more performance attributes associated with one of the network policy performance tiers.

13. The system of claim 12 comprising a policy and charging rules function (PCRF) that is configured to generate and install a policy rule on a policy charging enforcement function (PCEF), wherein the policy rule is based on the enhanced network policy.

14. The system of claim 12 comprising at least one processor, wherein the communications module and the policy enhancement module are implemented by at least one processor.

15. The system of claim 12 wherein receiving the indication includes receiving two or more indications that two or more users are eligible for enhanced network policy.

16. A system for providing providing interactive user controlled policy, the system comprising:
  a communications module for receiving, from an application service provider, an indication that a user is eligible for enhanced network policy in response to the user accessing an application service provided by the application service provider; and
  a policy enhancement module for enhancing at least one attribute of a network policy associated with the user in response to receiving the indication;
  wherein receiving the indication includes receiving a group indication for a group of users that indicates that the group of users are eligible for enhanced network policy, wherein the group indication includes two or more subscriber identifiers for identifying two or more users.

17. The system of claim 12 wherein the policy enhancement module is configured to increase one of a guaranteed download bitrate, a maximum download bitrate, a permitted service flow, a permitted quality of service (QoS) class, a permitted access point name (APN), a permitted destination IP address, a permitted destination port number, and a download quota.

18. The system of claim 12 wherein the communications module is configured to send the indication of the enhancement of the at least one attribute of the network policy to at least one of a policy and charging rules function (PCRF) and a resource and admission control sub-system (RACS).

19. The system of claim 18 wherein the communications module is configured to send the indication of enhanced network policy using a Diameter interface.

20. The system of claim 12 wherein the communications module is configured to instruct a policy and charging enforcement function (PCEF) to install one or more PCC rules.

21. The system of claim 12 wherein the policy enhancement module is configured to enhance the at least one attribute of the network policy of the user for one of: only sessions associated with the application service provider, only for sessions not associated with the application service provider, and for all sessions regardless of whether the sessions are associated with the application service provider.

22. The system of claim 12 wherein the policy enhancement module is configured to generate accounting and billing records associated with a communications session provided while the at least one attribute of the network policy is enhanced.

23. The system of claim 12 wherein the application service comprises an online game.

24. The system of claim 12 wherein the application service comprises a streaming audio or video service.

25. A non-transitory computer readable medium comprising computer executable instructions embodied in a non-transitory computer readable medium and when executed by a processor of a computer performs steps comprising:
  at a policy enhancement server (PES):
    receiving, from an application service provider, an indication that a user is eligible for enhanced network policy in response to the user accessing an application service provided by the application service provider; and
    in response to receiving the indication, enhancing at least one attribute of a network policy associated with the user
    wherein the policy enhancement module is configured to establish one or more network policy performance tiers associated with different network policies and providing the application service to the user using one or more performance attributes associated with one of the network policy performance tiers.

* * * * *